US008652996B2

(12) United States Patent
Kwan

(10) Patent No.: US 8,652,996 B2
(45) Date of Patent: Feb. 18, 2014

(54) IRREVERSIBLE THERMOCHROMIC PIGMENT CAPSULES

(75) Inventor: Wing Sum Vincent Kwan, Chicago, IL (US)

(73) Assignee: Sanford, L.P., Oak Brook, IL (US)

( * ) Notice: Subject to any disclaimer, the term of this patent is extended or adjusted under 35 U.S.C. 154(b) by 103 days.

(21) Appl. No.: 13/342,020

(22) Filed: Dec. 31, 2011

(65) Prior Publication Data

US 2013/0172183 A1 Jul. 4, 2013

(51) Int. Cl.
*B41M 5/50* (2006.01)

(52) U.S. Cl.
USPC ............ 503/201; 503/213; 503/214; 503/227

(58) Field of Classification Search
USPC .................................. 503/201, 213, 214, 227
See application file for complete search history.

(56) References Cited

U.S. PATENT DOCUMENTS

| | | | |
|---|---|---|---|
| 3,516,941 A | 6/1970 | Matson | |
| 3,560,229 A | 2/1971 | Farnham | |
| 3,658,543 A | 4/1972 | Gerlach, Jr. et al. | |
| 4,021,591 A * | 5/1977 | DeVries et al. | ..................... 8/468 |
| 4,028,118 A | 6/1977 | Nakasuji et al. | |
| 4,062,644 A * | 12/1977 | Sponaes et al. | ..................... 8/471 |
| 4,162,165 A | 7/1979 | Schwab | |
| 4,421,560 A | 12/1983 | Kito et al. | |
| 4,425,161 A | 1/1984 | Shibahashi et al. | |
| 4,547,429 A | 10/1985 | Greiner et al. | |
| 4,550,676 A | 11/1985 | Francis | |
| 4,620,941 A | 11/1986 | Yoshikawa et al. | |
| 4,622,267 A | 11/1986 | Riecke | |
| 4,720,301 A | 1/1988 | Kito et al. | |
| 4,732,810 A | 3/1988 | Kito et al. | |
| 4,865,648 A | 9/1989 | Kito et al. | |
| 5,002,924 A | 3/1991 | Seitz | |
| 5,128,308 A | 7/1992 | Talvalkar | |
| 5,194,183 A | 3/1993 | Munch et al. | |
| 5,248,652 A | 9/1993 | Talvalkar | |
| 5,350,633 A | 9/1994 | Sumii et al. | |
| 5,350,634 A | 9/1994 | Sumii et al. | |
| 5,401,577 A | 3/1995 | Seitz | |
| 5,500,040 A | 3/1996 | Fujinami | |
| 5,527,385 A | 6/1996 | Sumii et al. | |
| 5,558,699 A | 9/1996 | Nakashima et al. | |
| 5,558,700 A | 9/1996 | Shibahashi et al. | |
| 5,591,255 A | 1/1997 | Small et al. | |
| 5,785,746 A | 7/1998 | Kito et al. | |
| 5,786,838 A | 7/1998 | Steinhauser et al. | |
| 5,873,932 A | 2/1999 | Fujita et al. | |
| 5,879,438 A | 3/1999 | Fujita et al. | |
| 5,879,443 A | 3/1999 | Senga et al. | |
| 5,919,404 A | 7/1999 | Fujita et al. | |
| 5,922,115 A | 7/1999 | Sano et al. | |
| 5,997,849 A | 12/1999 | Small et al. | |
| 6,004,900 A * | 12/1999 | O'Brien, III | .................. 503/227 |
| 6,048,387 A | 4/2000 | Shibahashi et al. | |
| 6,139,779 A | 10/2000 | Small et al. | |
| 6,251,571 B1 | 6/2001 | Dessauer et al. | |
| 6,326,332 B1 | 12/2001 | Takayama | |
| 6,413,305 B1 | 7/2002 | Mehta et al. | |
| 6,494,950 B1 | 12/2002 | Fujita et al. | |
| 6,638,620 B2 | 10/2003 | Nakashima et al. | |
| 6,669,765 B2 | 12/2003 | Senga et al. | |
| 6,700,125 B2 | 3/2004 | Ito et al. | |
| 6,863,720 B2 | 3/2005 | Kitagawa et al. | |
| 6,953,345 B1 | 10/2005 | Nakashima et al. | |
| 6,964,168 B1 | 11/2005 | Pierson et al. | |
| 7,168,876 B2 | 1/2007 | Nakashima et al. | |
| 7,325,910 B2 * | 2/2008 | Pelletier | .......................... 347/85 |
| 7,332,109 B2 | 2/2008 | Senga et al. | |
| 7,335,624 B2 | 2/2008 | Senga et al. | |
| 7,494,537 B2 | 2/2009 | Ono et al. | |
| 7,575,386 B2 | 8/2009 | Shibahashi et al. | |
| 7,632,564 B2 | 12/2009 | Nakashima | |
| 7,708,913 B2 | 5/2010 | Fujita | |
| 7,736,695 B2 | 6/2010 | Schwantes et al. | |
| 8,182,596 B2 | 5/2012 | Kurihara et al. | |
| 2002/0107304 A1 | 8/2002 | Leu et al. | |
| 2002/0170461 A1 | 11/2002 | Mehta et al. | |
| 2003/0122123 A1 | 7/2003 | Deng et al. | |
| 2004/0229754 A1 | 11/2004 | Fujita | |
| 2006/0112851 A1 | 6/2006 | Ono et al. | |
| 2007/0189836 A1 | 8/2007 | Senga et al. | |

(Continued)

FOREIGN PATENT DOCUMENTS

| | | |
|---|---|---|
| DE | 10303914 A1 | 8/2004 |
| EP | 1149880 A1 | 10/2001 |

(Continued)

OTHER PUBLICATIONS

Muthyala (ed.), Chemistry and Applications of Leuco Dyes, Topics in Applied Chemistry, Plenum Press (1997).

(Continued)

*Primary Examiner* — Bruce H Hess
(74) *Attorney, Agent, or Firm* — Marshall, Gerstein & Borun LLP

(57) ABSTRACT

Disclosed herein are irreversible thermochromic ink compositions including a solvent and a sublimable dye dissolved in the solvent. The solvent and the sublimable dye can be, optionally, encapsulated. Written marks made with the thermochromic ink compositions can be subjected to a force directing component and/or a heat source, to promote sublimation of the sublimable dye, thereby causing the written mark to change color or become substantially colorless.

13 Claims, No Drawings

(56) References Cited

U.S. PATENT DOCUMENTS

| | | |
|---|---|---|
| 2007/0251912 A1 | 11/2007 | Sixou et al. |
| 2008/0113862 A1 | 5/2008 | Stovold et al. |
| 2008/0124164 A1 | 5/2008 | Ito et al. |
| 2008/0292385 A1 | 11/2008 | Wase et al. |
| 2009/0050013 A1 | 2/2009 | Fujita |
| 2009/0071370 A1 | 3/2009 | Nakashima |
| 2010/0012018 A1 | 1/2010 | Ribi |
| 2010/0098475 A1 | 4/2010 | Fujita et al. |
| 2010/0098476 A1 | 4/2010 | Imamura et al. |
| 2010/0120614 A1 | 5/2010 | Ono |
| 2010/0275813 A1 | 11/2010 | Kurihara et al. |

FOREIGN PATENT DOCUMENTS

| | | |
|---|---|---|
| EP | 1469046 A1 | 10/2004 |
| FR | 1223330 * | 6/1960 |
| WO | WO-01/04221 A1 | 1/2001 |

OTHER PUBLICATIONS

International Search Report and Written Opinion for corresponding international application No. PCT/US2012/070590, mailing date Mar. 6, 2013.

Matsui Shikiso Chemical Co., Ltd, Technical Data Sheet for Thermolock AQ Ink #79 (Aug. 5, 2009).

* cited by examiner

IRREVERSIBLE THERMOCHROMIC PIGMENT CAPSULES

FIELD OF THE INVENTION

The disclosure is generally related to irreversible thermochromic ink compositions and, more particularly, to irreversible thermochromic ink compositions including a sublimable dye and a solvent.

BACKGROUND

Thermochromic inks change color in response to changes in temperature. Known thermochromic inks often include leuco dyes as the color changing component. Leuco dyes typically exist in two different forms, a colored form and a substantially colorless form. Leuco dyes which change forms in response to local changes in pH are typically used in known thermochromic inks. The change in pH can be brought about in such systems by contacting the leuco dye with a color activator/developer which can induce proton transfer to the leuco dye and thereby cause the leuco dye to adopt its colored form, but similar color changes from substantially colorless to colored can also result from electron transfer and/or proton transfer reactions. From a structural standpoint, the change from substantially colorless to colored is often induced by cleaving a lactone ring to form a more highly conjugated species that absorbs in the visible range. The reverse change from colored to substantially colorless can then be brought about by proton abstraction and reformation of the lactone ring.

Known thermochromic inks often exhibit 'hysteresis' associated with the color change, i.e., the color change of written marks made with such inks is reversible. One representative example, U.S. Pat. No. 5,558,699, discloses a thermochromic color-memory composition comprising a homogeneous solubilized mixture of three essential components including (a) an electron-donating color-developing organic compound, (b) an electron-accepting compound, and (c) a reaction medium for controlling the reaction of (a) with (b). The thermochromic compositions of the '699 patent change color with a large hysteresis width (AH) of from 8° C. to 80° C. As a result, written marks made using the thermochromic inks typically exhibit a colored state at room temperature, change from the colored state to substantially colorless upon application of heat (i.e., heat can be applied to a substrate to erase written marks previously made thereon), and change back to the initial colored state when cooled below a certain temperature (i.e., the substrate is cooled, thereby 're-forming' the color of the written marks). Thus, known thermochromic inks typically include a reaction medium which can promote or impede the reaction between the leuco dye and the activator at certain temperatures, such that the leuco dye is present in its colorless form at certain temperatures which are typically substantially above room temperature.

The reversibility of the color change can be particularly undesirable in certain situations, for example, if the consumer does not wish for the original written marks to be 're-revealed.'

DETAILED DESCRIPTION

Disclosed herein are irreversible thermochromic ink compositions, methods of making and using the irreversible thermochromic ink compositions, and irreversible thermochromic pigment capsules. The disclosed irreversible thermochromic ink compositions include a solvent and a sublimable dye in the solvent. The irreversible thermochromic pigment capsules and irreversible thermochromic inks according to the disclosure are capable of irreversibly changing color, for example, upon application of frictional forces during an erasure process. Such a color change is advantageously irreversible, even upon cooling.

In one aspect, an irreversible thermochromic ink includes a carrier and irreversible thermochromic pigment capsules dispersed in the carrier, the irreversible thermochromic pigment capsules comprising a shell and a core, the core comprising a solvent and a sublimable dye dissolved in the solvent. The core solvent is preferably a volatile solvent. The carrier includes a solvent, a resin, or a mixture thereof. The carrier solvent is preferably a volatile solvent. The shell is preferably frangible, i.e., the shell ruptures (rather than is plastically deformed) when pressure is applied thereto.

In another aspect, an irreversible thermochromic ink composition includes a solvent and a sublimable dye dissolved in the solvent. According to this aspect, the solvent and the sublimable dye are not encapsulated, i.e., the irreversible thermochromic ink according to this aspect of the disclosure may exclude irreversible thermochromic pigment capsules as disclosed herein. Thus, in this aspect, the sublimable dye is (directly) dissolved and/or dispersed in the solvent of the ink composition itself. The ink composition solvent is typically a volatile solvent. The ink composition may further include a resin dissolved or dispersed in the solvent.

Also disclosed herein is an irreversible thermochromic ink pigment capsule including a shell and a core, the core comprising a solvent and a sublimable dye dissolved in the solvent. The core solvent is preferably a volatile solvent. The shell is preferably frangible, i.e., the shell ruptures (rather than is plastically deformed) when pressure is applied thereto.

Also disclosed are methods of erasing a written mark made with irreversible thermochromic ink compositions including a solvent and a sublimable dye dissolved in the solvent.

In one aspect, a method of erasing a written mark includes (i) making a written mark on a substrate with an irreversible thermochromic ink comprising a carrier and irreversible thermochromic pigment capsules dispersed in the carrier, the irreversible thermochromic pigment capsules comprising a shell and a core, the core comprising a solvent and a sublimable dye dissolved in the solvent, the written mark providing a coating comprising a plurality of the irreversible thermochromic pigment capsules on the substrate, and (ii) applying a force directing component to the written mark to form ruptured irreversible thermochromic pigment capsules, thereby allowing the sublimable dye to sublime such that the ruptured irreversible thermochromic pigment capsules and hence the written mark change color (i.e., changing from a first colored state to a second colored state) or become substantially colorless (i.e., changing from colored to substantially colorless) so as to "erase" the written mark. The core solvent is preferably a volatile solvent. The carrier includes a solvent, a resin, or a mixture thereof. The carrier solvent is also preferably a volatile solvent. The shell is preferably frangible, i.e., the shell ruptures (rather than is plastically deformed) when pressure is applied thereto. A heat source may also be applied to the written mark to assist in the erasure process.

In another aspect, a method of erasing a written mark includes (i) making a written mark on a substrate with an irreversible thermochromic ink including a solvent and a sublimable dye dissolved in the solvent, the written mark providing a coating comprising the irreversible thermochromic ink on the substrate, and (ii) heating the written mark to a temperature sufficient to cause the sublimable dye to sublime such that written mark changes color (i.e., changing from a first colored state to a second colored state) or becomes substantially colorless (i.e., changing from colored to substantially colorless) so as to "erase" the written mark. According to this aspect, the solvent and the sublimable dye are not encapsulated, i.e., the irreversible thermochromic ink according to this aspect of the disclosure may exclude irreversible thermochromic pigment capsules as disclosed herein. Thus, in this aspect, the sublimable dye is (directly) dissolved and/or dispersed in the solvent of the ink composition itself. The ink composition solvent is typically a volatile solvent. The ink composition may further include a resin dissolved or dispersed in the solvent. Heating of the written mark may be effected by application of a force directing component to the written mark, application of a heat source, or a combination thereof.

Also disclosed are writing instruments containing irreversible thermochromic ink compositions including a solvent and a sublimable dye in the solvent.

In one aspect, the writing instrument includes an irreversible thermochromic ink comprising a carrier and irreversible thermochromic pigment capsules dispersed in the carrier, the thermochromic pigment capsules comprising a shell and a core, the core comprising a solvent and a sublimable dye dissolved in the solvent. The core solvent is preferably a volatile solvent. The carrier includes a solvent, a resin, or a mixture thereof. The carrier solvent is also preferably a volatile solvent. The shell is preferably frangible, i.e., the shell ruptures (rather than is plastically deformed) when pressure is applied thereto. Writing instruments comprising a writing point in fluid communication with an ink reservoir such as ball point pens, fountain pens, and markers can be used.

In another aspect, the writing instrument includes an irreversible thermochromic ink comprising a solvent and a sublimable dye dissolved in the solvent. According to this aspect, the solvent and the sublimable dye are not encapsulated, i.e., the irreversible thermochromic ink according to this aspect of the disclosure may exclude irreversible thermochromic pigment capsules as disclosed herein. Thus, in this aspect, the sublimable dye is (directly) dissolved and/or dispersed in the solvent of the ink composition itself. The ink composition solvent is typically a volatile solvent. The ink composition may further include a resin dissolved or dispersed in the solvent. Writing instruments comprising a writing point in fluid communication with an ink reservoir such as ball point pens, fountain pens, and markers can be used.

A written mark can be made on a substrate using the irreversible thermochromic ink compositions disclosed herein. The written mark can be subjected to pressure, for example, by applying a force directing component, such as a conventional eraser, over and/or about the written mark. Where the solvent and the sublimable dye are encapsulated, application of the force directing component will rupture the irreversible thermochromic pigment capsules enabling the sublimable dye to be released from the capsules and exposed to atmospheric conditions. Additionally, whether or not the ink includes such irreversible thermochromic pigment capsules, application of the force directing component to the written mark will generate heat and/or friction thus promoting sublimation of the sublimable dye. Upon sublimation of the sublimable dye, any written marks made using the ink compositions according to the disclosure will advantageously and irreversibly change color (i.e., changing from a first colored state to a second colored state) or become substantially colorless (i.e., changing from colored to substantially colorless), and thus be "erased", as further described below.

As used herein, the term "irreversible thermochromic" refers to an ink composition capable of undergoing a color change that cannot be reversed by application of a temperature change or an ink pigment capsule including an ink composition capable of undergoing a color change that cannot be reversed by application of a temperature change. As a result, the disclosed thermochromic ink compositions cannot exhibit hysteresis (at least upon sublimation of the sublimable dye component(s)) and are advantageously therefore considered to be eraseable (whether the written marks change from a first colored state to a second colored state or change from colored to substantially colorless upon sublimation of the sublimable dye).

As mentioned above, the irreversible thermochromic ink compositions include a solvent and a sublimable dye dissolved in the solvent. As a result of including this combination, the ink compositions and written marks made with the ink compositions are initially colored but change color or become substantially colorless after sublimation of the sublimable dye.

In irreversible thermochromic ink compositions not including irreversible thermochromic pigment capsules as disclosed herein, sublimation of the sublimable dye component(s) generally commences immediately after a written mark is made, i.e., after the written mark and associated sublimable dye component(s) are exposed to atmospheric conditions. Upon sublimation of the sublimable dye component, the written marks made with the ink compositions change color or become substantially colorless.

In irreversible thermochromic ink compositions including irreversible thermochromic pigment capsules as disclosed herein, sublimation of the sublimable dye component(s) generally commences after a force directing component is applied to a written mark (which includes a coating comprising a plurality of the irreversible thermochromic pigment capsules) to form ruptured irreversible thermochromic pigment capsules. By rupturing the irreversible thermochromic pigment capsules, the core contents including the sublimable dye are released from the capsules and exposed to atmospheric conditions such that the sublimable dye can sublime. Upon sublimation of the sublimable dye components, the written mark changes color or becomes substantially colorless.

In both irreversible thermochromic ink compositions (whether including or not including the irreversible thermochromic pigment capsules), the rate of sublimation can be increased, for example, by subjecting the written mark (and thus any sublimable dye component associated therewith) to a friction force and/or elevated temperature, i.e., conditions which promote sublimation of the sublimable dye. Thus, written marks can be made with the irreversible thermochromic ink composition on a substrate and then rendered a different color or substantially colorless, for example, by an erasure process. The erasure process can include the application of a frictional force to the written marks, so as to effect heating at the area of contact (i.e., increase the temperature) and also rupture any irreversible thermochromic pigment capsules present in the written marks. Frictional forces can be applied, for example, using a force directing component such as a conventional eraser. Any material capable of applying a friction force to a substrate can be a suitable force directing component to rupture and/or heat the irreversible thermochromic pigment capsules, including but not limited to rubber, thermoplastic materials, thermoplastic elastomers, metals, and wood can be used. Alternatively, the erasure process can include heating the written mark without or in combination with the application of a friction force. The written mark can be heated in any known way including directing a light or laser thereon, directing heated air thereover, applying a heated element such as a heated block element (e.g., an ironing element), etc.

Significantly, in both irreversible thermochromic ink compositions (including and not including the irreversible thermochromic pigment capsules), upon sublimation of the sublimable dye, the written marks undergo an irreversible color change from a first colored state to a second colored state (in one preferred aspect, the second colored state is substantially colorless). As a result of the "loss" of the sublimable dye, once written marks made with these irreversible thermochromic ink compositions lose their initial coloring, their initial color cannot be restored by cooling the written marks (or the substrate which previously carried the written marks), for example, because the irreversible thermochromic ink compositions cannot and do not exhibit thermal hysteresis in association with a temperature change after the sublimable dye has sublimed therefrom and is no longer present to provide color to the written marks. In preferred embodiments, the irreversible thermochromic ink compositions do not contain any colorant other than the sublimable dye. As a result, the color of the written marks made in accordance with the disclosure changes from colored to substantially colorless (because the irreversible thermochromic ink compositions exclude additional colorants). Of course, if an additional (non-sublimable) colorant is included in the irreversible thermochromic ink compositions that persists despite application of frictional forces and/or heat (a "non-volatile" colorant), the color of the written mark will change from a first colored state to a second colored state (the second colored state being attributable to the additional colorant(s). Any number of conventional pigments and dyes could be used as the additional colorant that persists despite application of frictional forces and/or heat.

Sublimable Dye

As used herein, the term "sublimable dye" refers to dyes that transform from a solid state directly to a gaseous state without going through a liquid state. Such dyes are commonly referred to in the industry as disperse dyes. Sublimable dyes for use in the irreversible thermochromic ink compositions according to the disclosure should sublime at a temperature between about 120° C. and about 300° C., between about 130° C. and about 220° C., between about 140° C. and about 220° C., and/or between about 120° C. and about 170° C. Sublimable dyes that sublime at lower temperatures such as between about 120° C. and about 170° C. are generally preferred because sublimation can be effected by application of a force directing component alone. However, sublimable dyes that sublime at higher temperatures are also suitable, particularly when heat is used in the erasure process (in combination with or without application of frictional forces).

Sublimable dyes suitable for use in the irreversible thermochromic ink compositions can alternatively be described using the enthalpy of vaporization. Useful sublimable dyes will have a low enthalpy of vaporization, but not so low that it evaporates very quickly at ambient temperature (i.e., 20-25° C.). Sublimable dyes for use in the irreversible thermochromic ink compositions according to the disclosure should have enthalpies of vaporization below 90 kJ per mole, more preferably below 75 kJ per mole, and/or even more preferably below 60 kJ per mole.

Typically, the sublimable dyes for use in the irreversible thermochromic ink compositions according to the disclosure are classified in the Colour Index as "Disperse Dyes", and generally are selected from nitroarylamine dye compounds, azo dye compounds, and anthraquinone dye compounds. Of course, combinations of sublimable dyes may also be used. Generally, the sublimable dyes for use in the irreversible thermochromic ink compositions according to the disclosure contain an amino group and do not contain a solubilizing sulfonic group.

Representative sublimable dyes include but are not limited to Intratherm Yellow P-1343NT, Intratherm Yellow P-1346NT, Intratherm Yellow P-346, Intratherm Brilliant Yellow P-348, Intratherm Brilliant Orange P-365, Intratherm Brown P-1301, Intratherm Dark Brown P-1303, Intratherm Pink P-1335NT, Intratherm Brilliant Red P-1314NT, Intratherm Red P-1339, Intratherm Blue P-1305NT, Intratherm Blue P-1404, C.I. Disperse Blue 359, Intratherm Orange P-367 Intratherm Brilliant Blue P-1309, C.I. Disperse Black 3, C.I. Disperse Red 60, Intratherm Yellow P-343NT, C.I. Disperse Yellow 54, Disperse Blue 60, C.I. Disperse Yellow 82, C.I. Disperse Yellow 54, C.I. Disperse Yellow 3, C.I. Disperse Yellow 23, C.I. Disperse Orange 3, C.I. Disperse Orange 25, C.I. Disperse Orange 7, C.I. Disperse Orange 1, C.I. Disperse Red 1, C.I. Disperse Red 9, C.I. Disperse Red 60, C.I. Disperse Red 13, C.I. Disperse Violet 1, C.I. Disperse Blue 14, C.I. Disperse Blue 3, C.I. Disperse Blue 359, C.I. Disperse Blue 19, C.I. Disperse Blue 134, C.I. Disperse Blue 72, C.I. Disperse Blue 26, C.I. Disperse Blue 180, Vat Red 41, Vat Blue 3, Vat Blue 1, quinhydrone, and other suitable dye materials. Such materials are available commercially from Keystone Aniline Corporation, Crompton & Knowles, BASF, Bayer, E. I. du Pont de Nemours & Co., Ciba, ICI, and others. Quinhydrone, Disperse Black 3, and Vat Red 41 are exemplary sublimable dyes that will sublime upon application of frictional forces alone. Vat Blue 3, Vat Blue 1, Disperse Red 9, Disperse Yellow 54, and Disperse Orange 25 are exemplary sublimable dyes that will sublime upon application of frictional force most often in combination with additional heating.

Typically, the irreversible thermochromic ink compositions include at least 1 weight percent (wt. %), at least 5 wt. % and/or at least 10 wt. % of the sublimable dye based on the total weight of the irreversible thermochromic ink composition. For example, the amount of sublimable dye present in the irreversible thermochromic ink composition is typically between about 1 wt. % and about 25 wt. %, between about 2.5 wt. % and about 20 wt. %, and/or between about 5 wt. % and about 17.5 wt. % based on the total weight of the thermochromic ink composition. The amount of sublimable dye in the ink compositions should be upwardly adjusted in view of the transparency of the thermochromic pigment capsule shell (if encapsulated). Thus, the amount of sublimable dye is typically somewhat greater in ink compositions including the irreversible thermochromic pigment capsules as disclosed herein relative to irreversible thermochromic ink compositions not including irreversible thermochromic pigment capsules as disclosed herein.

Solvent

In embodiments where the irreversible thermochromic ink compositions contain irreversible thermochromic pigment capsules as disclosed herein, the core includes a solvent to solvate the sublimable dye. The core solvent is preferably a volatile solvent. The core solvent should be selected so as not to solvate the thermochromic pigment capsules.

Further, in such embodiments, the irreversible thermochromic pigment capsules are dispersed in a carrier, the carrier most often comprising a solvent. The carrier includes a solvent, a resin, or a mixture thereof. The carrier solvent is also preferably a volatile solvent. The carrier solvent should be selected so as not to solvate the thermochromic pigment capsules.

The irreversible thermochromic ink compositions also contain a solvent when the sublimable dye is (directly) dissolved in the solvent of the ink composition itself (e.g., embodiments in which the sublimable dye is not encapsulated). The ink composition solvent is typically a volatile solvent. The ink composition may further include a resin dissolved or dispersed in the solvent.

Generally, each of core, carrier, and ink composition solvents are not limited and may be aqueous, organic, polar, or non-polar provided that the sublimable dye is sufficiently soluble therein. Because relatively higher boiling point solvents will serve as a heat sink and thus impede sublimation of the sublimable dye, however, lower boiling point solvents are generally preferred. Preferred solvents have boiling points less than about 300° C., less than about 250° C., such as between about 40° C. and about 250° C., and/or between about 50° C. and about 220° C.

Representative solvents include but are not limited to hydrocarbons and halo-substituted hydrocarbons. Exemplary hydrocarbons include volatile branched chain hydrocarbons having from about 4 to about 30 carbon atoms, preferably from about 4 to about 20 carbon atoms, more preferably from about 6 to about 20 carbon atoms. Such hydrocarbons include, for example, isoparaffins commercially available from Exxon Chemical Company (Baytown, Tex. U.S.A.), as ISOPAR M (C13-C14 Isoparaffin), ISOPAR C (C7-C8 Isoparaffin), ISOPAR E (C8-C9 Isoparaffin), ISOPAR G (C10-C11 Isoparaffin), ISOPAR L (C11-C13 Isoparaffin), ISOPAR H (C11-C12 Isoparaffin). Other non-limiting examples of suitable branched chain hydrocarbons are commercially available from Presperse, Inc. (South Plainfield, N.J.) as PERMETHYL 99A (isododecane), PERMETHYL 102A (isoeicosane), and PERMETHYL 101A (isohexadecane). Other non-limiting examples of suitable branched chain hydrocarbons include petroleum distillates such as those available from Phillips Chemical as SOLTROL 130, SOLTROL 170, and those available from Shell as SHELL SOL 70, SHELL SOL 71, and SHELL SOL 2033. Additional suitable hydrocarbons include dodecane, octane, decane, hydrogenated polyisobutanes and combinations thereof. For example, the NORPAR series of paraffins available from Exxon Chemical Company such as NORPAR 12, NORPAR 13, and NORPAR 15 can be used as the carrier solvent. Yet another example includes C11-C15 alkanes/cycloalkanes, such as those available from Exxon as EXXSOL™ D80.

Irreversible Thermochromic Pigment Capsules

The irreversible thermochromic pigment capsules include a core (generally corresponding to an interior/center of the capsules) and a shell which provides a continuous, exterior surface that encapsulates and contains the core components, which are typically liquid. The core contains at least a solvent and a sublimable dye dissolved in the solvent. The core can also include a resin.

The irreversible thermochromic pigment capsule shells generally comprise about 5 wt. % to about 30 wt. % of the irreversible thermochromic pigment capsule based on the weight of the entire capsule, with the core components comprising the balance. To achieve sufficient color intensity in written marks, the irreversible thermochromic ink compositions typically contain at least about 30 wt. %, at least about 40 wt. %, at least about 50 wt. %, for example, between about 20 wt. % and about 60 wt. %, between about 30 wt. % and about 50 wt. %, and/or between about 35 wt. % and about 45 wt. % of the irreversible thermochromic pigment capsules based on the total weight of the irreversible thermochromic ink composition.

The particle size (or diameter) of the capsule can vary in different applicators. For example, the irreversible thermochromic ink compositions for use in ball pens, thermochromic pigment capsules having a diameter of between about 0.1 microns and about 5 microns, between about 0.1 microns and about 3 microns, and/or between about 0.1 microns and 1 micron are highly desirable. For thermochromic ink compositions for use in markers (e.g., comprising a fibrous reservoir and a porous nib in fluid communication therewith), thermochromic pigment capsules having a diameter between about 1 micron and about 50 microns, between about 1 micron and about 30 microns, between about 1 micron and about 15 microns and/or between about 1 micron and about 10 microns can be used. For thermochromic ink compositions for use with stamps, capsules having a diameter in excess of 100 microns are typically preferred, for example, thermochromic pigment capsules having a diameter between about 100 microns and about 500 microns.

The shell is preferably frangible and thus fabricated to rupture rather than plastically deform when pressure is applied thereto. The shell does not typically rupture into multiple fragments but does rupture (or burst) upon application of pressure such that the components therein are exposed to atmospheric conditions. As a result, upon application of a force directing component to a written mark made with an ink composition comprising thermochromic pigment capsules, a portion of the thermochromic pigment capsules are ruptured, thereby allowing the sublimable dye to sublime from the ruptured thermochromic pigment capsules such that any written marks becomes substantially colorless or change color as previously described. A typical force directing component comprises an eraser such as those conventionally used in conjunction with writing instruments. Any material capable of directing a force to a substrate including but not limited to (relatively harder) thermoplastic materials, thermoplastic elastomers, metals, and wood can be used. The heat and/or friction generated by contacting the substrate with the force directing component to erase the written mark can facilitate sublimation of the sublimable dye, thereby promoting the intended color change. Preferably, the capsules rupture under a force of less than about 25 psi (172.4 kilopascals), less than about 20 psi (137.9 kilopascals), and/or less than 10 psi (69.0 kilopascals). Of course, the capsules are typically manufactured such that a user would easily be able to apply the force directing component to the a written mark made with an ink composition including irreversible thermochromic pigment capsules to easily break apart the capsules, thereby releasing the sublimable due from the capsules such that it can sublime. As described throughout the application, after the sublimable dye sublimes, the written marks change colors or become substantially colorless.

The shell is typically formed of a polymer. The shell can also be formed of other materials including but not limited to gum Arabic, gelatin, ethylcelluloses, poly(lactide)s, poly(lactide-glycolide)s (i.e., poly(lactic-co-glycolic acid), urea-formaldehyde condensates, and maltodextrins. Other exemplary polymers for the shell include but are not limited to polyureas, polyamides, polyesters, polyurethanes, mixtures thereof, and other similar polycondensation products, which may have optionally incorporated within their polymer structures certain soft and flexible segments such as polyether or polymethylene moiety.

The shell material may influence which microencapsulation techniques would be most efficient for forming the thermochromic pigment capsules. Suitable encapsulation processes include known chemical and physical methods for forming polymeric capsules. Representative examples of chemical methods include complex coacervation, interfacial polymerization (IFP), polymer-polymer incompatibility, in-situ polymerization, centrifugal force process, and submerged nozzle process. Representative examples of physical methods include spray drying, fluid bed coating, centrifugal extrusion, and rotational suspension separation. The selected encapsulation method depends on the requirement of the thermochromic capsule size, which in turn is dependent on the application method and applicator (as explained in further detail below).

In a representative coacervation process, the core component(s) which is to be encapsulated is typically emulsified or dispersed in a suitable dispersion medium. This medium is typically aqueous but involves the formation of a polymer rich phase. Most frequently, this medium is a solution of the intended capsule wall material. The solvent characteristics of the medium are changed such as to cause phase separation of the wall material. The wall material is thereby contained in a liquid phase which is also dispersed in the same medium as the intended capsule core material. The liquid wall material phase deposits itself as a continuous coating about the dispersed droplets of the internal phase or capsule core material. The wall material is then solidified. U.S. Pat. No. 7,736,695 discloses such a process and is incorporated herein by reference in its entirety.

In a representative interfacial polymerization process, a microcapsule wall of a polyamide, an epoxy resin, a polyurethane, a polyurea or the like is formed at an interface between two phases. In interfacial polymerization, the materials to form the capsule wall are in separate phases, one in an aqueous phase and the other in a fill phase. Polymerization occurs at the phase boundary. Thus, a polymeric capsule shell wall forms at the interface of the two phases thereby encapsulating the core material. Wall formation of polyester, polyamide, and polyurea capsules typically proceeds via interfacial polymerization. U.S. Pat. No. 4,622,267 the entirety of which is incorporated herein by reference discloses an interfacial polymerization technique for preparation of microcapsules in which the core material is initially dissolved in a solvent and an aliphatic diisocyanate soluble in the solvent mixture is added. Subsequently, a nonsolvent for the aliphatic diisocyanate is added until the turbidity point is just barely reached. This organic phase is then emulsified in an aqueous solution, and a reactive amine is added to the aqueous phase. The amine diffuses to the interface, where it reacts with the diisocyanate to form polymeric polyurethane shells. A similar technique, used to encapsulate salts which are sparingly soluble in water in polyurethane shells, is disclosed in U.S. Pat. No. 4,547,429, also incorporated herein by reference in its entirety.

U.S. Pat. No. 3,516,941 teaches polymerization reactions in which the material to be encapsulated, or core material, is dissolved in an organic, hydrophobic oil phase which is dispersed in an aqueous phase. The aqueous phase has dissolved materials forming aminoplast resin which upon polymerization form the wall of the microcapsule. A dispersion of fine oil droplets is prepared using high shear agitation. Addition of an acid catalyst initiates the polycondensation forming the aminoplast resin within the aqueous phase, resulting in the formation of an aminoplast polymer which is insoluble in both phases. As the polymerization advances, the aminoplast polymer separates from the aqueous phase and deposits on the surface of the dispersed droplets of the oil phase to form a capsule wall at the interface of the two phases, thus encapsulating the core material. This process produces the microcapsules. Polymerizations that involve amines and aldehydes are known as aminoplast encapsulations. Urea-formaldehyde (UF), urea-resorcinol-formaldehyde (URF), urea-melamine-formaldehyde (UMF), and melamine-formaldehyde (MF), capsule formations proceed in a like manner.

The shell can be formed, for example, by polymerizing oil-soluble monomers (precursors). Depending on the process, the oil soluble shell forming precursors present in the microdroplet phase during the microencapsulation process are preferably comprised of diisocyanates, diacyl chloride, and bischloroformate having soft and flexible moieties such as polymethylene or polyether segments within their molecular structures. Optionally, appropriate polyfunctional crosslinking agents, such as triisocyanate or triacyl chloride, in effective amounts, such as, for example, from about 1 weight percent to about 25 weight percent, can also be added to generate crosslinked shell polymers to improve their mechanical strength. Illustrative examples of the shell precursors include the polyether-based polyisocyanate such as Uniroyal Chemical's diphenylmethane diisocyanate-based liquid polyether VIBRATHANES® B-635 and B-843 and toluene diisocyanate-based liquid polyether VIBRATHANES® B-604 and B-614, and Mobay Chemical Corporation's liquid polyether isocyanate prepolymers, E-21 or E-21A, 743, 744, adipoyl chloride, fumaryl chloride, suberoyl chloride, succinyl chloride, phthaloyl chloride, isophthaloyl chloride, terephthaloyl chloride, ethylene glycol bis-chloroformate, diethylene glycol bischloroformate, and triethylene glycol bischloroformate. In addition, other polyfunctional reagents can also be added as co-reactants to improve shell properties such as mechanical strength and pressure sensitivity. In one embodiment, the aforementioned co-reactants can be selected from the group consisting of benzene diisocyanate, toluene diisocyanate, diphenylmethane diisocyanate, 1,6-hexamethylene diisocyanate, bis(4-isocyanatocyclohexyl)methane, MONDUR® CB-60, MONDUR® CB-75, MONDUR® MR, MONDUR® MRS 10, PAPI® 27, PAPI® 135, ISONATE® 143L, ISONATE® 181, ISONATE® 125M, ISONATE® 191, and ISONATE® 240.

The shell can also be formed, for example, by polymerizing water-soluble monomers. Water-soluble shell forming monomer components can be added to an aqueous phase including polyamine or polyol including bisphenol. Illustrative examples of the water-soluble shell monomers include ethylenediamine, tetramethylenediamine, pentamethylenediamine, 2-methylpentamethylene diamine, hexamethylenediamine, p-phenylenediamine, m-phenylenediamine, 2-hydroxy trimethylenediamine, diethylenetriamine, triethylenetetraamine, tetraethylenepentaamine, 1,8-diaminooctane, xylylene diamine, bis(hexamethylene)triamine, tris(2-aminoethyl)amine, 4,4'-methylene bis(cyclohexylamine), bis (3-aminopropyl)ethylene diamine, 1,3-bis(aminomethyl) cyclohexane, 1,5-diamino-2-methylpentane, piperazine, 2-methylpiperazine, 2,5-dimethylpiperazine, 1,4-bis(3-aminopropyl) piperazine, and 2,5-dimethylpentamethylene diamine, bisphenol A, and bisphenol Z. When desired, a water soluble crosslinking component such as triamine or triol can also be added in effective amounts sufficient to introduce crosslinking into the shell polymer structure to enhance its mechanical strength.

In each of the foregoing techniques, capsule thickness can be controlled in view of the (intended) final capsule size and pressure needed to rupture the capsule. If the capsule wall thickness is too high such that it results in a relatively large particle size (at least with respect to the system used to apply an ink composition containing the capsule), the thermochromic capsule may not be able to pass through the writing point or fibrous reservoir of a writing instrument containing the thermochromic ink. On the other hand, if the shell thickness is too little, the capsule may be ruptured prematurely during the ink deposition process. Persons having ordinary skill in this art are able to balance these considerations appropriately. The thermochromic capsule shells typically have a wall thickness generally, for example, of less than about 5 microns, but greater than about 0.5 microns, for example, between about 0.5 microns and 2 microns.

Additives

All irreversible thermochromic ink compositions disclosed herein can include other additives. Preferred additives include, for example, biocide(s), surface tension modifier(s), other synergistic resin(s), surfactant(s), humectant(s), dispersing agent(s), and other additives known in the art. These additives can be added to the irreversible thermochromic ink composition solvent and/or included in the core of the irreversible thermochromic pigment capsules, if encapsulation is employed. The additives can be added in any amount such that the overall performance of the ink compositions is not adversely affected in any aspect.

The disclosed irreversible thermochromic ink compositions can be used in a variety of applicators writing instruments such as ball point pens, fountain pens, and markers, printers and print cartridges, and stamps.

The following examples are provided for illustration and are not in any way to limit the scope of the invention.

Example 1

Three parts of Quinhydrone (Aldrich Chemical, Milwaukee, Wis.) were dissolved in 97 parts of acetone (Aldrich Chemical, Milwaukee, Wis.). The solution was loaded into a SHARPIE® marker (Sanford LP, Oakbrook, Ill.) including a nib in fluid communication with a fibrous reservoir and produced bluish-black written marks upon drying. The marks were subjected to a temperature between about 100° C. and 150° C. for 15 seconds and the bluish-black color of the written marks changed to substantially colorless. The initial color of the written marks was not regenerated. The fluid can also be encapsulated to produce an irreversible thermochromic pigment capsule as disclosed herein.

What is claimed is:

1. An irreversible thermochromic ink composition comprising:
   a liquid carrier and thermochromic pigment capsules dispersed in the liquid carrier, the thermochromic pigment capsules comprising a shell and a core, the core comprising a volatile solvent and a sublimable dye dissolved in the core solvent, wherein the liquid carrier comprises a volatile solvent.

2. The irreversible thermochromic ink composition of claim 1, wherein the sublimable dye comprises a dye that sublimes at a temperature between about 120° C. and about 300° C.

3. The irreversible thermochromic ink composition of claim 1, wherein the sublimable dye is selected from the group consisting of nitroarylamine dye compounds, azo dye compounds, anthraquinone dye compounds, and combinations thereof.

4. The irreversible thermochromic ink composition of claim 1, wherein the shell is frangible.

5. An irreversible thermochromic pigment capsule comprising a shell and a core, the core comprising a volatile solvent and a sublimable dye dissolved in the volatile solvent.

6. The irreversible thermochromic pigment capsule of claim 5, wherein the sublimable dye is selected from the group consisting of nitroarylamine dye compounds, azo dye compounds, anthraquinone dye compounds, and combinations thereof.

7. The irreversible thermochromic pigment capsule of claim 5, wherein the shell comprises a polymer.

8. The irreversible thermochromic pigment capsule of claim 5, wherein the shell is frangible.

9. A method of erasing a written mark comprising:
   (i) making a written mark on a substrate with an irreversible thermochromic ink composition according to claim 1, the written mark providing a coating comprising a plurality of the irreversible thermochromic pigment capsules on the substrate; and,
   (ii) applying a force directing component to the written mark to form ruptured irreversible thermochromic pigment capsules, thereby allowing the sublimable dye to sublime such that the written mark changes color or becomes substantially colorless.

10. The method of claim 9, further comprising applying a heat source to the written mark.

11. A writing instrument containing the irreversible thermochromic ink composition of claim 1.

12. The writing instrument of claim 11, wherein the writing instrument is selected from ball point pens, fountain pens, and markers.

13. The method of claim 9 wherein the application of a force directing component to the written mark to form ruptured irreversible thermochromic pigment capsules exposes the core solvent and the sublimable dye to atmospheric conditions.

* * * * *